(12) United States Patent
Sherman (10) Patent No.: US 7,370,000 B2
(45) Date of Patent: May 6, 2008

(54) SYSTEM AND METHOD FOR PROVIDING ADDITIONAL INSURANCE

(75) Inventor: Lawrence M. Sherman, Westport, CT (US)

(73) Assignee: Value-Security, L.L.C., Westport, CT (US)

( * ) Notice: Subject to any disclaimer, the term of this patent is extended or adjusted under 35 U.S.C. 154(b) by 860 days.

(21) Appl. No.: 09/780,266

(22) Filed: Feb. 9, 2001

(65) Prior Publication Data

US 2001/0034619 A1    Oct. 25, 2001

Related U.S. Application Data (60) Provisional application No. 60/181,653, filed on Feb. 10, 2000.

(51) Int. Cl.
*G06Q 40/00* (2006.01)

(52) U.S. Cl. ............................................. 705/4; 705/35

(58) Field of Classification Search .................... 705/4, 705/38, 2, 10, 35, 1; 600/300; 707/100
See application file for complete search history.

(56) References Cited

U.S. PATENT DOCUMENTS

| | | | | |
|---|---|---|---|---|
| 5,655,085 A | * | 8/1997 | Ryan et al. ..................... | 705/4 |
| 5,673,402 A | * | 9/1997 | Ryan et al. ..................... | 705/38 |
| 5,845,256 A | * | 12/1998 | Pescitelli et al. ............... | 705/4 |
| 5,873,066 A | * | 2/1999 | Underwood et al. ........... | 705/4 |
| 6,163,770 A | * | 12/2000 | Gamble et al. ................. | 705/4 |
| 6,302,844 B1 | * | 10/2001 | Walker et al. .............. | 600/300 |

OTHER PUBLICATIONS

Ferling, R. et al. New Plans, New Policies. Best's Review. (Life/health insurance edition). Oldwick: Apr. 1991.vol. 91, Iss. 12; p. 54, 13 pgs.*

* cited by examiner

*Primary Examiner*—C. Luke Gilligan
*Assistant Examiner*—Natalie A. Pass
(74) *Attorney, Agent, or Firm*—Mintz, Levin, Cohn, Ferris, Glovsky and Popeo, P.C.

(57) ABSTRACT

The invention provides a system and method for providing additional insurance to a fully-qualified insured party to increase a total benefit amount of insurance. More particularly, the invention provides a computer system and method for providing additional life insurance to increase a total benefit of life insurance to a fully-qualified insured party based upon an underwriting and medical evaluation performed to assess the eligibility of the insured party for an existing or underlying primary life insurance plan. Additional life insurance according to the invention may be obtained through the internet by remote computers and internet access devices well known in the art.

24 Claims, 5 Drawing Sheets

SYSTEM AND METHOD FOR PROVIDING ADDITIONAL INSURANCE

CLAIM OF PRIORITY TO PRIOR APPLICATION

This application claims priority under 35 U.S.C. § 119(e) to U.S. provisional patent application Ser. No. 60/181,653, filed on Feb. 10, 2000, incorporated herein by reference.

FIELD OF THE INVENTION

The invention generally relates to a system and method providing additional insurance to an insured party to increase a total benefit amount of insurance. More particularly, the invention provides a computer system and method providing additional insurance to an insured party based upon underwriting performed to assess the eligibility of the insured party for existing or underlying insurance.

BACKGROUND OF THE INVENTION

Prior art methods providing insurance for a variety of risks and liabilities often demonstrate the prescript: high benefit limits command high insurance premiums. Consumers often select insurance benefit limits based upon the amount of coverage consumers can afford rather than the amount of coverage consumers require to adequately cover their exposure to particular liabilities and risks. Insurance premiums generally include the benefit expenses incurred by insurance providers and administrative costs to issue insurance coverage. However, a substantial portion of insurance premiums includes the underwriting costs associated with assessing eligibility of consumers, as well as marketing costs to sell insurance to consumers.

Consumers who wish to obtain additional insurance to increase the limits of existing insurance, or to increase the total benefit of insurance, from a new provider would be subject to new and additional underwriting and a new medical evaluation, which is inconvenient to consumers and often causes great concern in consumers with respect to passing another medical evaluation. Consumers who seek additional insurance from their present insurance providers would be required to pay a current market premium. Consumers usually cannot take advantage of the previous underwriting process and, in cases of life insurance, the previous medical evaluation performed to assess their eligibility. Insurance providers generally do not offer additional insurance to their insured parties for reduced premiums, although further underwriting may not be required. Insurance providers may offer additional insurance coverage for reduced premiums only to a highly select base of insured parties who have previously purchased fully-underwritten insurance coverage within a specified period of time. Such offers typically provide only limited coverage based upon the amount of insurance in force and are available for a limited time only.

In addition, insurance providers typically do not rely upon the underwriting of other insurance providers to issue new insurance coverage. For example, insurance providers have offered to convert another insurance provider's term life insurance coverage to whole or permanent life insurance. To avoid anti-selection in such cases, insurance providers require termination of the term life insurance to avoid the total immediate amount of coverage to be increased as a result of such a transaction.

Consumers who wish to obtain additional insurance to increase their benefit limits must undergo new and additional underwriting, a new medical evaluation, and pay current market premiums for additional insurance. Therefore, it is desirable to provide a system and method providing additional insurance which is easily-obtainable and affordable to an insured in order for the insured to increase a total benefit of insurance.

SUMMARY OF THE INVENTION

The invention provides a method for providing additional insurance to a fully-qualified insured party to increase a total benefit of insurance to the insured party comprising receiving information from a prospective fully-qualified insured party, wherein the information obtained includes information concerning a primary insurer of the prospective insured party and information concerning a primary life insurance plan issued by the primary insurer to the prospective insured party. The method of the invention further comprises formulating an offer to the prospective insured party for a secondary insurance plan based upon the information concerning the primary insurer and the primary life insurance plan issued, and issuing the secondary life insurance plan to the prospective insured upon acceptance of the offer.

The invention also includes a computer system for providing additional life insurance to a fully-qualified insured party. In one embodiment of the invention, additional life insurance is provided through a network of insurance brokers, agents and service providers and approved underwriting primary insurers included within the additional insurance network. An insurable party obtains a primary life insurance plan through, for example, an insurance broker of the network by methods well known in the art, wherein the insurable party initially provides underwriting information to the insurance broker who furnishes the underwriting information to an underwriting primary insurer. The primary insurer conducts the full underwriting and medical evaluation of the insurable party to assess the eligibility of the insured party for the primary life insurance plan. If the primary insurer is approved for inclusion by the additional insurance network, upon issuance of the underwriting approval and the primary life insurance plan by the primary insurer, the insurance broker may make an offer to the insured party for additional life insurance as a secondary life insurance plan. The benefit amount and type of the primary life insurance plan for which the insured party is eligible provides a guideline to the insurance broker to determine the benefit amount and type of the secondary life insurance plan to be offered to the insured party. Without additional underwriting and medical evaluation, the broker may immediately offer additional life insurance to the insured party upon issuance of the primary life insurance plan.

In other embodiments of the invention, the information required by the additional life insurance network to provide a secondary life insurance plan may be provided by prospective insurable parties to the multiple of insurance brokers, agents and service providers or the computer system of the invention through the internet from remote computers and other internet access devices well known in the art.

In another embodiment of the invention, additional life insurance is provided to a fully-qualified insured party through a multi-user global communication and information network, a.k.a. the internet, a multiple of insurance brokers, agents and service providers, at least one database module for compiling and storing information regarding underwriting approval for primary life insurance, as well as other information provided upon issuance of primary life insurance to prospective insured parties, and a multiple of web sites, which provide access to the database module and communication between the multiple of insurance brokers, agents and service providers, the database module, and prospective insured parties through the multi-user global information and communication network, or the internet.

BRIEF DESCRIPTION OF THE DRAWINGS

For a better understanding of the invention, reference is made to the drawings which are incorporated herein by reference and in which.

DETAILED DESCRIPTION OF THE INVENTION

Illustrative embodiments of the invention described herein provide a system and method for providing low-cost, easily-obtainable additional insurance to increase a total benefit amount of insurance to an insured. More particularly, the invention provides a computer system and method for providing additional insurance to an insured based upon the underwriting and evaluation performed to assess the eligibility of the insured for existing or underlying insurance. In embodiments of the invention, additional insurance is provided by the computer system and method of the invention to a fully-qualified insured without requiring further underwriting and evaluation and, therefore, without incurring additional underwriting and medical evaluation costs. The computer system and method of the invention may provide any kind of additional insurance, such as, although not limited to, additional life insurance, additional accident insurance and additional disability insurance, based upon existing or underlying insurance of the same kind held by the insured. Although the computer system and method of the invention may provide any kind of additional insurance, for purposes of illustrating embodiments of the invention, the computer system and method will be described with respect to providing additional life insurance to an insured to increase the total benefit amount of life insurance to the insured.

Embodiments of the invention will be described with reference to FIGS. 1-5 which are presented for the purpose of illustrating embodiments and are not intended to limit the scope of the claims, wherein like parts are designated by like reference numerals throughout. As used herein, the term "primary insurer" refers to an insurance company, an insurance provider, or an insurance underwriter who performs an underwriting process and evaluation to assess the eligibility of a potential insured. The terms "primary insurance", "primary plan" and "primary insurance plan" refer to an in-force existing or underlying insurance plan underwritten and issued by a primary insurer to an insured. The term "second insurance", "secondary plan" and "secondary insurance plan" refer to an additional insurance plan provided to the insured party of the primary insurance or primary insurance plan.

Figure 1:
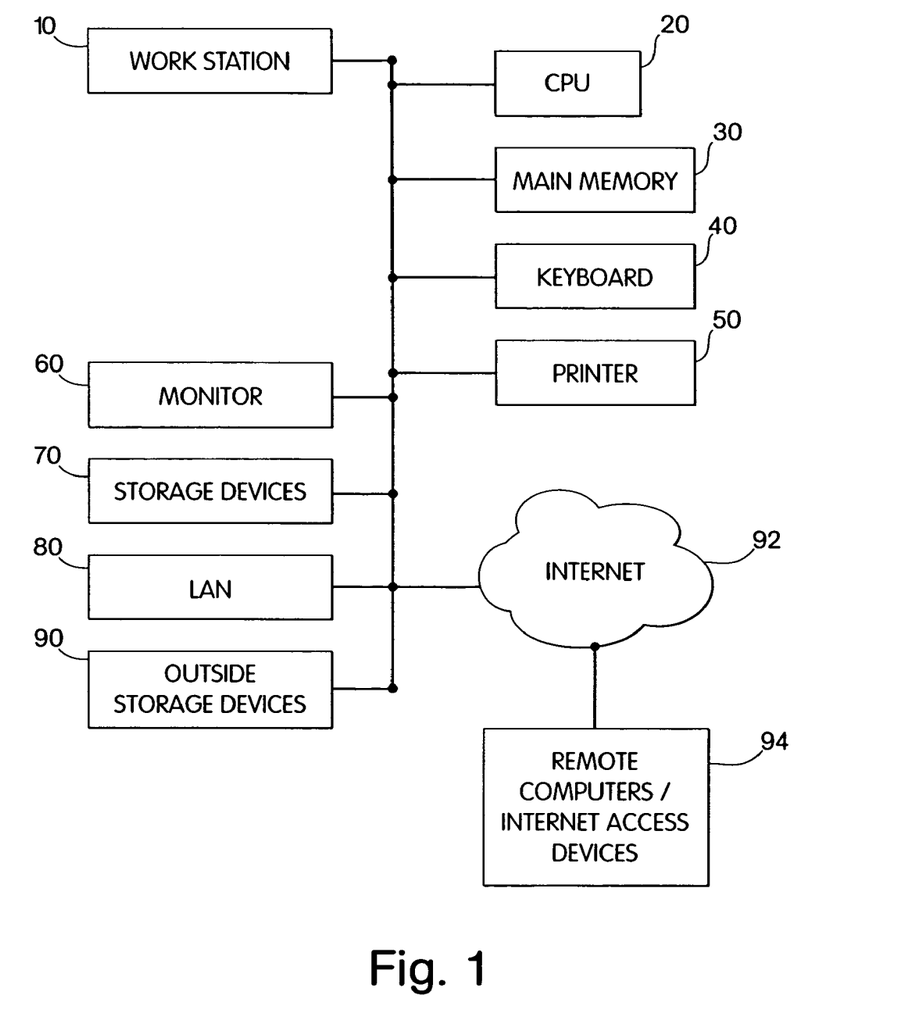
FIG. 1 is a hardware block diagram illustrating the operation of a computer system for providing additional insurance in accordance with a first embodiment of the invention.

Referring to FIG. 1, a hardware block diagram illustrates a first embodiment of the invention of a computer system for providing additional life insurance in accordance with a first embodiment of the invention comprising a typical computer workstation 10 containing a central processing unit (CPU) 20, an input device, such as a keyboard 40 or mouse, an output device such as computer monitor screen 60, a printer 50, and one or more storage devices 70. A typical workstation is a personal computer, such as a Dell personal computer, with an Intel Pentium microprocessor. The system may be coupled to a Local Area Network 80 (LAN) or other communication channels for receiving and transmitting information to and from potential and existing insured parties, and to provide access to data stored in outside storage devices 90. In addition, the computer system may be coupled to an intranet or the internet 92 to allow prospective insured parties to inquire about and/or to subscribe to additional life insurance or secondary life insurance plans through the internet 92 from remote computers and other internet access devices 94 well known in the art.

Figure 2:
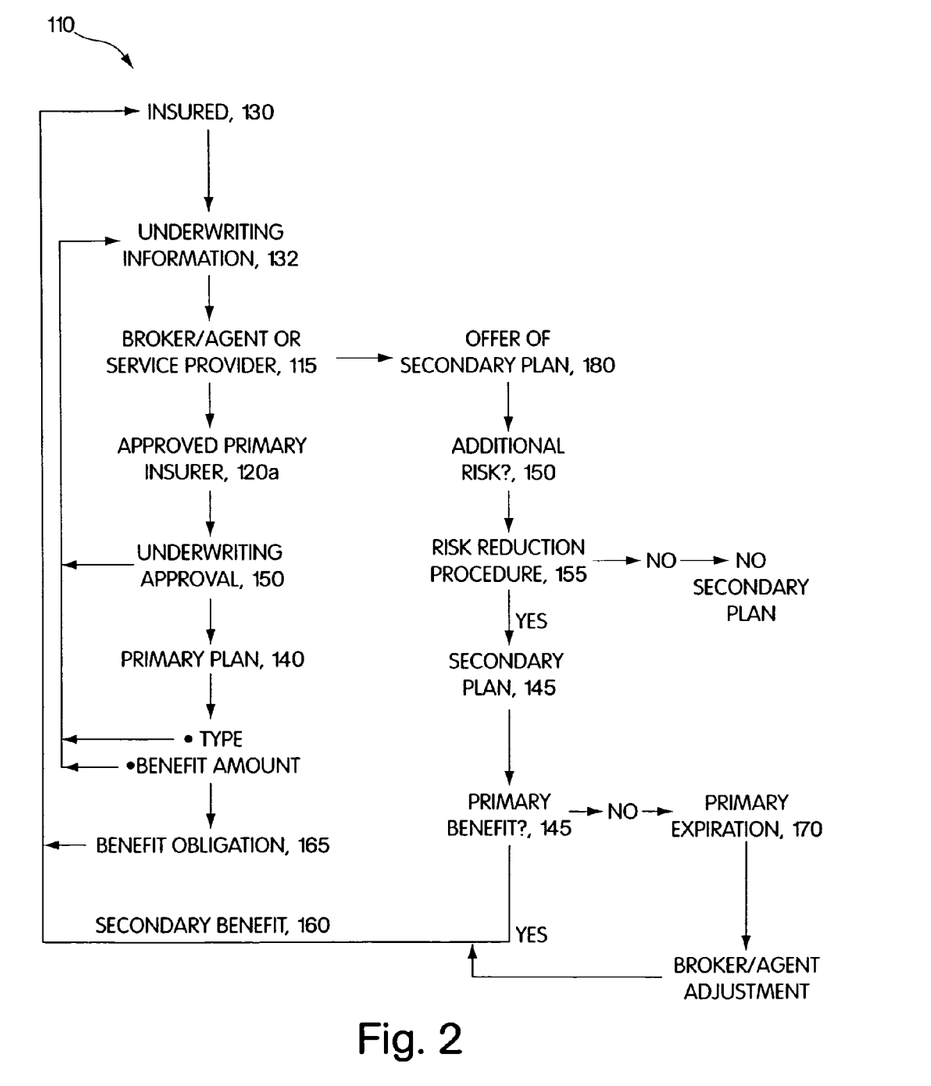
FIG. 2 is a flow diagram of a first aspect of a first embodiment system illustrating the flow and organization of information to form and issue additional insurance.

Referring to FIG. 2, a flow diagram illustrates a first aspect of a first embodiment of the invention providing additional insurance, and particularly illustrates the flow and organization of information to form and issue additional life insurance as a secondary life insurance plan to increase a total benefit amount of life insurance to a fully-qualified insured party. According to the first aspect of the first embodiment of the invention, additional life insurance is provided through a network 110 of a multiple of insurance brokers, insurance agents and service providers 115, who generally provide life insurance products to consumers, and a multiple of primary insurers 120, who underwrite and issue life insurance. Each of the multiple of primary insurers 120 is approved for inclusion within the additional insurance network 110, as described herein. The multiple of insurance brokers, insurance agents and service providers 115 are uniquely placed in the insurance market as sellers and distributors of insurance, wherein insurance brokers, agents and service providers 115 can readily offer and sell additional life insurance to fully-qualified insured parties in order to increase the insured parties' total benefit amount of life insurance. Service providers 115 may include, for example, providers of financial investment services or banking services, who underwrite and/or broker life insurance products. However, it is understood service providers 115 may include other companies and entities providing consumer services.

The additional insurance network 110 provides an offer for additional life insurance to an insured party 130 after at least one underlying or primary life insurance plan 140 identifying the insured party 130 is issued by an approved primary insurer 120a. Upon acceptance of the offer for additional life insurance, the additional insurance network 110 issues a secondary life insurance plan 145 based upon the underlying primary life insurance plan 130, thereby increasing the total benefit amount of life insurance held by the insured party 130.

The additional insurance network 110 relies upon issuance of the primary life insurance plan 140 to determine if the offer for the secondary life insurance plan 145 should be extended to the insured party 130. If a primary life insurance plan 140 is issued to an insured party 130 by a primary insurer 120a, approved by and included within the additional insurance network 110, an insurance broker, agent or other service provider 115 recognizes that the insured party 130 is an insurable risk for additional life insurance and may automatically extend an offer for such additional life insurance as a secondary life insurance plan 145. Insurance brokers, agents, and service providers 115 of the additional insurance network 110 essentially rely upon the underwriting and medical evaluation performed by the primary insurer 120a to assess the eligibility of the insured party 130 for the primary life insurance plan 140. Insurance brokers, agents, and service providers 115 typically receive an underwriting approval 150 from the primary insurer 120a, indicating the insured party 130 is approved for a particular kind of life insurance with a specific benefit limit as well as other specified terms and conditions.

The primary plan 140 is typically issued by the primary insurer 120a and distributed by insurance brokers, agents and service providers 115 to the insured party 130. Issuance of the primary life insurance plan 140 indicates to the insurance brokers, agents and service providers 115 of the additional insurance network 110 that the insured party 130 meets specific underwriting eligibility requirements of the primary insurer 120a and, therefore, is an insurable risk for the secondary life insurance plan 145. The secondary life insurance plan 145, in effect, "piggybacks" the underwriting approval 150 of the primary life insurance plan 140. Based upon previous underwriting and evaluation, the fully-qualified insured parties 130 represent a select class of risk to whom secondary life insurance 145 may be offered by the additional insurance network 110.

In other embodiments of the invention, the additional insurance network 110 may obtain underwriting information from insured parties and provide primary and secondary life insurance plans 140 and 145 by receiving and transmitting information from insured parties through the internet, as illustrated in FIG. 1, wherein the network of insurance brokers, agents and service providers and primary insurers are accessed by and communicate with potential insured parties from remote computers 92 and internet access devices 94.

By relying upon the underwriting and medical evaluation of the primary insurer 120a issuing the primary life insurance plan 140, the additional insurance network 110 does not incur substantial underwriting and medical evaluation costs or other costs typically associated with assessing eligibility and certifying the health of the insured party 130. The secondary life insurance plan 145 is, therefore, issued by the additional insurance network 110 at substantially lower costs. Costs to insurance brokers, agents and service providers 115 may be limited to the administrative costs associated with issuing the secondary life insurance plan 145. Therefore, the substantial marketing, and underwriting and medical evaluation costs associated with issuing a life insurance plan are avoided by the additional insurance network 110 by relying upon the underwriting approval 150 provided to issue the primary life insurance plan 140. The additional insurance network 110 may pass on the lower costs to the insured party 130 as discounted premiums for secondary life insurance 145. Thus, an insured party 130 of a primary life insurance plan 140 can substantially increase the total benefit amount of their life insurance with payment of an additional discounted premium.

For example, a primary life insurance plan 140 may be issued to an insured party 130 having a total benefit limit of $1,000,000 at a premium rate of, for example, $100 per $100,000. The additional insurance network 110 may offer the insured party 130 additional life insurance as a secondary life insurance plan 145 with a benefit limit of $500,000 to increase the total benefit amount held by the insured party 130. Since the insured party 130 has been previously underwritten and evaluated for the benefit limit of $1,000,000, the additional insurance network 110 may rely upon issuance of the primary life insurance plan 140 to offer the secondary life insurance plan 145 and pass on the lower costs to issue the secondary life insurance plan 145 as a discounted premium rate of, for example, $50.00 per $100,000. Thus, the insured party 130 can substantially increase the benefit limit of life insurance by 50% for a substantially discounted premium.

The additional insurance network 110 relies upon the issuance of primary life insurance plans 140 by primary insurers 120 whose underwriting standards and guidelines satisfy minimum acceptable criteria for inclusion in the additional insurance network 110. Since the primary insurers 120 issuing primary life insurance are relied upon by the additional insurance network 110 to assess the risk and eligibility of insured parts 130, only primary insurers 120 who employ underwriting and medical evaluation methods acceptable to the additional insurance network 110 may be relied upon by member brokers, agents and service providers 115 to determine to whom secondary life insurance should be offered.

The insurance brokers, agents and service providers 115 comprising the additional insurance network 110 are members or affiliates of the additional insurance network 110 subject to minimum eligibility requirements identified by the additional insurance network 110. The eligibility requirements for insurance brokers, agents and service providers 115 for participation in the additional insurance network 110 may include, for example, acceptable practices to provide primary and secondary life insurance 140 and 145, claims adjustment methods and capabilities, etc., as well as marketing and selling capabilities and capacities.

Figure 3:
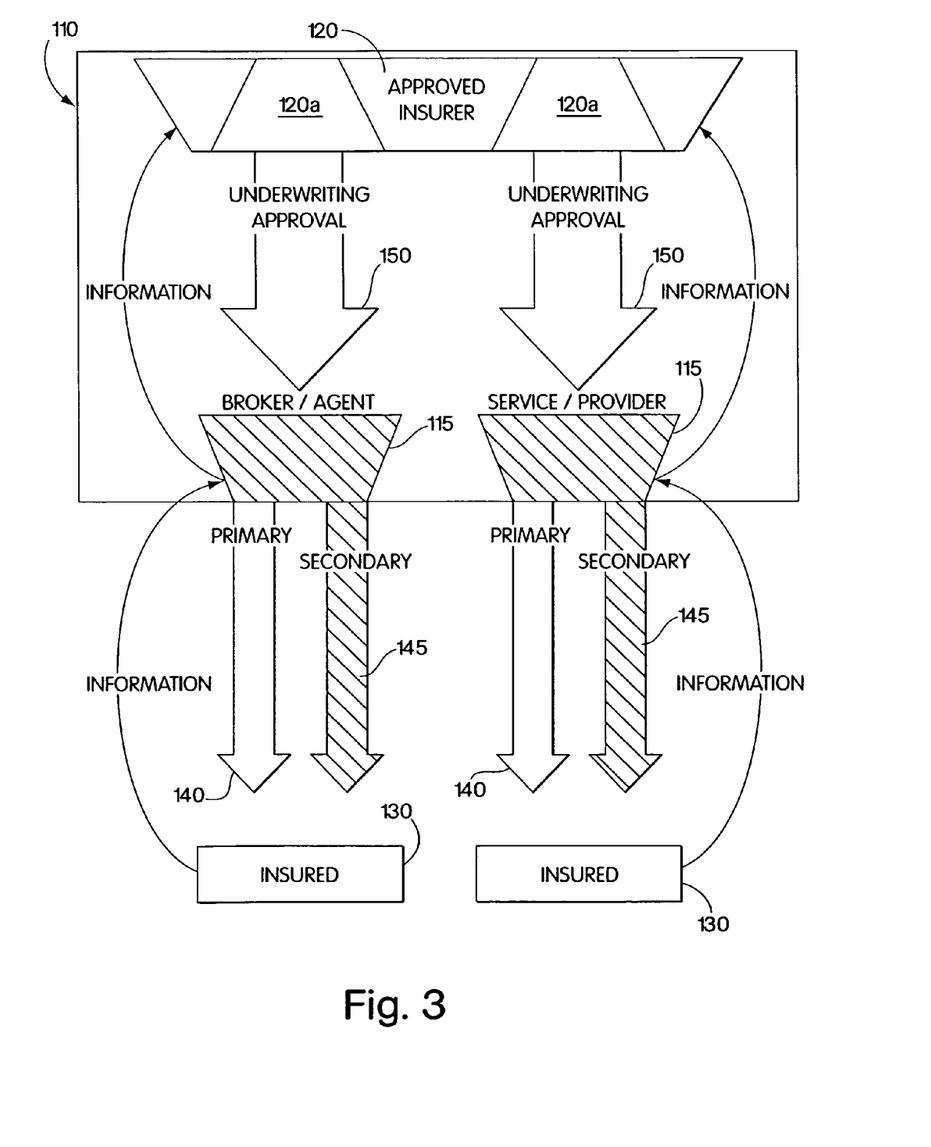
FIG. 3 is a flow diagram of the first aspect of the first embodiment of the invention.

Referring to FIGS. 2 and 3, the first aspect of the first embodiment of the invention provides additional life insurance through the traditional channels of insurance brokers, agents and service providers 115 and approved underwriting primary insurers 120 of the additional insurance network 110. As shown in the flow diagram of FIG. 2, the insured party 130 obtains a primary life insurance plan 140 through, for example, an insurance broker 115 by methods well known in the art, wherein the insured party 130 initially provides underwriting information 132 to the insurance broker 115 who furnishes the underwriting information 132 to an underwriting primary insurer 120a. The primary insurer 120a conducts the full underwriting and medical evaluation of the insured party 130 to assess the eligibility of the insured party 130 for the primary life insurance plan 140. If the primary insurer 120a is approved for inclusion by the additional insurance network 110, upon issuance of the underwriting approval 150 and the primary life insurance plan 140 by the primary insurer 120a, the insurance broker 115 may make an offer 180 to the insured party 130 for additional life insurance as a secondary life insurance plan 145. The benefit amount and type of the primary life insurance plan 140 for which the insured party 130 is eligible provides a guideline to the insurance broker 115 to determine the benefit amount and type of the secondary life insurance 145 plan to be offered to the insured party 130. Without additional underwriting and medical evaluation, the broker 115 may immediately offer additional life insurance to the insured party 130 upon issuance of the primary life insurance plan 140.

Because the additional insurance network 110 relies upon the underwriting and medical evaluation performed by the primary insurer 120a to issue the primary life insurance plan 140, the secondary life insurance plan 145 is issued to the insured party 130 prior to any event or change that may substantially effect the eligibility of the insured party 130 since the primary life insurance plan 140 was issued. The insured party 130 may no longer represent a risk equivalent to the original and fully underwritten risk of the primary life insurance plan 140.

Thus, risk reduction procedures to avoid or at least to substantially minimize any additional risk 150 assumed above the risk for which the primary life insurance plan 140 was written may be used by brokers, agents and service providers 115. A risk reduction procedure 155 may include, for example, a minimum underwriting process conducted by member brokers, agents and services providers 115 of the additional insurance network 110, wherein the insured party 130 is required to complete an application including, for example, one or more anti-selection questions and a statement of good health. Alternatively, the insured party 130 may be asked to provide information concerning other insurance coverage the insured party 130 holds or other insurance coverage the insured party 130 has applied for to determine if a pattern of abuse exists. In addition, the insured party 130 may be required to respond to health-related questions relevant to specific health issues.

As another risk reduction procedure 155 to avoid or at least to substantially minimize any risk 150 assumed by the additional insurance network 110, the secondary life insurance plans 145 may only be offered to insured parties 130 who hold a primary life insurance plan 140 of some minimum benefit amount. Because the underwriting and medical evaluation requirements generally increase with high benefit amounts and large-sized plans, a minimum benefit amount of primary life insurance may be established by the additional insurance network 110 which is sufficiently high to reflect a particular level of underwriting and medical evaluation performed by the primary insurer 120a. Insurance brokers, agents and service providers 115, therefore, may be limited to offer additional life insurance only to those insured parties 130 holding primary life insurance plans 140 of a minimum benefit amount.

Another risk reduction procedure 155 which may be employed by the additional insurance network 110 would require the secondary life insurance plans 145 be issued and premiums paid by the insured parties 130 within a specified period of time. Issuance and payment of the premium for the secondary life insurance plan 145 would prevent and substantially reduce the risk exposure of the additional insurance network 110 to any unforeseen changes or events that substantially and directly effect the eligibility of the insured party 130. This risk reduction procedure 155 may also include a certification requirement, wherein the insured parties 130 provide a certification upon payment of premiums for the secondary life insurance plans 145 to state no changes or events have occurred to substantially alter the eligibility of the insured parties 130.

With respect to claims adjustment and distribution of benefit obligations under the secondary life insurance plan 145, the brokers, agents and service providers 115 of the additional insurance network 110 may link claims adjustment and benefit payments to the extent of claims adjustment and benefit payments demonstrated by primary insurers 120 issuing primary life insurance plans 140. As shown in FIG. 2, a benefit obligation or payment 160 would be made according to the secondary life insurance plan 145 to the extent benefits are paid by the primary insurer 120 of the primary life insurance plan 140. If the primary life insurance plan 140 pays a benefit obligation 165, then the additional insurance network 110 would pay the benefit obligation 160 under the secondary life insurance plan 145. In this respect, the secondary life insurance plan 145 "piggy backs" the benefit obligation 165 of the primary life insurance plan 140 in order to reduce the costs of claims adjustment and distribution of the benefit obligation 160. However, this benefit payment strategy would be dependent upon whether the primary life insurance plan 140 is in force during the term of the secondary life insurance plan 145. In the event the primary life insurance plan 140 has expired or terminated 170 during the term of the secondary life insurance plan 145, the member brokers, agents and service providers 115 may process the claim and distribute the benefit obligation 160 according to methods well known in the art. Alternatively, the insurance brokers, agents and service providers 115 may rely upon distribution of a benefit obligation by another primary insurer underwriting other insurance plans held by the insured party 130 to limit the extent of claims adjustment and payment of benefit obligations conducted by member brokers, agents and service providers 115.

As described above, the secondary life insurance plan 145 is issued by the additional insurance network 110 at low costs to member brokers and agents and service providers 115. The additional insurance network 110 significantly reduces the efforts required and the costs incurred by members to issue the secondary life insurance plan 145. Costs to members for providing secondary life insurance 145 are substantially variable rather than fixed expenses. Members 115 would only begin to incur expenses when transactions for secondary life insurance 145 are completed and secondary life insurance plans 145 issued. The bulk of expenses for members 115 of the additional insurance network 110 would occur in the future in the form of benefit obligations 160, which are very low or negative present value expenses.

Additional costs savings are also realized by members 115 of the additional insurance network 110 due to a substantial reduction in marketing costs to sell additional life insurance, since offers for secondary life insurance 145 can be made immediately upon issuance of primary life insurance 140 to insured parties 130 and do not require further solicitation of insured parties 130. Many costs associated with underwriting and marketing life insurance plans which do not materialize into issued life insurance plans would be eliminated by the additional insurance network 110.

In addition to distribution of benefit obligations in the future, actual costs to members 115, other than administrative costs to issue secondary life insurance, include the actual costs to purchase the additional or secondary life insurance. If secondary life insurance 145 is managed internally by the additional insurance network 110, actual costs to members 115 would only include the future benefit obligations 160 of secondary life insurance 145.

Primary insurers 120 participating in the additional insurance network 110 providing primary life insurance 140 may be motivated to become members of the additional insurance network 110 to remain competitive in their markets. Primary insurers 120 may initially sell primary life insurance 140 according to their established marketing strategies, offering primary life insurance 140 at current market value premiums. Upon issuance of primary life insurance 140, primary insurers 120 may subsequently offer additional life insurance at a discounted premium. Primary insurers 120 would earn additional revenue without incurring additional costs to provide secondary life insurance 145 and can pass on costs savings to insured parties 130 holding primary life insurance 140. Secondary life insurance 145 may serve as a customer retention tool. Insured parties 130 would be inclined to maintain their primary life insurance 140 with primary insurers 120 participating in the additional insurance network 110 if benefit obligations 160 under secondary life insurance 145 were subject to renewal of primary life insurance 140.

A feature and advantage of the additional insurance network 110 is the opportunity member insurance brokers, agents and service providers 115 have to select from the group of underwriting primary insurers 120 approved by and included within the additional insurance network 110. Members 115 may choose a particular primary insurer 120a based upon their reputation and their underwriting methods to issue primary life insurance 140. Therefore, members 115 may offer secondary life insurance 145 only to those insured parties 130 who hold primary life insurance 140 issued by approved primary insurers 120 of their choice.

Figure 4:
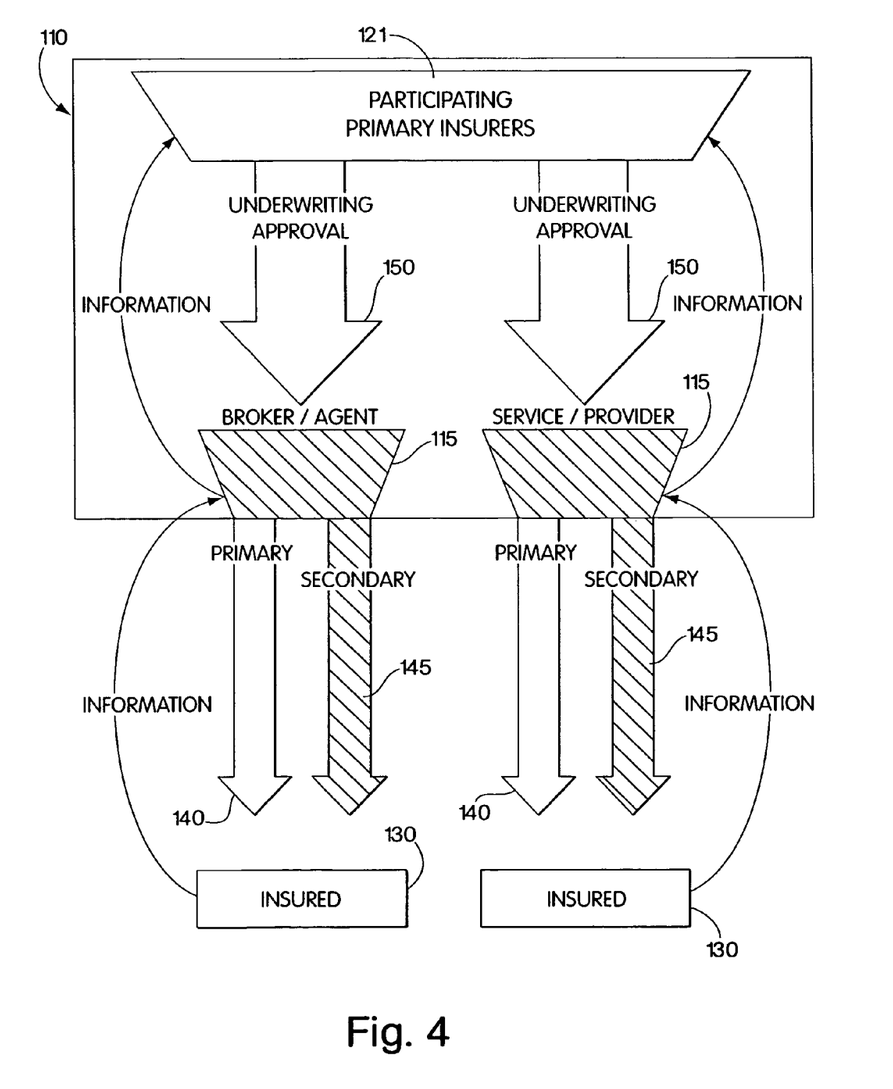
FIG. 4 is a flow diagram of a second embodiment of the invention.

Referring to FIG. 4, a second embodiment of the invention provides additional life insurance to a fully-qualified insured party through a network of a multiple of insurance brokers, agents and service providers 115 and a multiple of insurance providers and underwriters, referred to collectively herein as participating primary insurers 121. Participating primary insurers 121 underwrite and issue primary life insurance 140 and are included as members within the additional insurance network 110. The inclusion of the participating primary insurers 121 members provides opportunities for the participating primary insurers 121 to share underwriting information to remain competitive and to meet needs of insured parties 130. Participating primary insurers 121 who cannot competitively provide a particular life insurance product may wish to share their underwriting information through the additional insurance network 110 with another participating primary insurers 121 who can competitively provide the life insurance product. Member brokers, agents and service providers 115 would rely upon the sharing of underwriting information between participating primary insurers 121 to select competitive secondary life insurance 145 provided by participating primary insurers 121, thereby fulfilling the needs of insured parties 130 with a competitive product and retaining the insured parties 130 of the participating primary insurers 121 as clients within the additional insurance network 110.

For example, Insurer X may provide a variable life insurance plan as primary life insurance 140 to Insured party A who also requires term life insurance to cover temporary insurance needs. However, Insurer X does not provide term life insurance at competitive premiums. Rather than Insurer X losing A entirely as a potential customer for term life insurance, Insurer X may share its underwriting information through the additional insurance network 110 with other participating primary insurers 121 who can provide term life insurance at competitive premiums. Insurer Y, also a participating primary insurer 121 of the additional insurance network 110, provides term life insurance at competitive premiums. Insurer Y may issue through the additional insurance network 110 term life insurance to A as a secondary life insurance plan 145. As a result of Insurer X sharing its underwriting information with Insurer Y, Insurer Y can substantially reduce its underwriting costs and pass the costs savings on to A as a discounted premium. Insurer X may receive a fee from Insurer Y for sharing its underwriting information with the additional insurance network 110. Term life insurance would be issued by Insurer Y to A and provided as a secondary life insurance plan 145 and distributed by member brokers, agents and service providers 115 of the additional insurance network 110, as described above. In addition, member brokers, agents and service providers 115 may choose either Insurer Y or some other participating primary insurer 121 included in the additional insurance network 110 to provide competitive life insurance products to insured parties 130.

In other embodiments, the network of insurance brokers, agents and service providers and participating primary insurers may be accessed and communication with by prospective fully-qualified insured parties through the internet from remote computers 92 and internet access devices 94 well known in the art.

Figure 5:
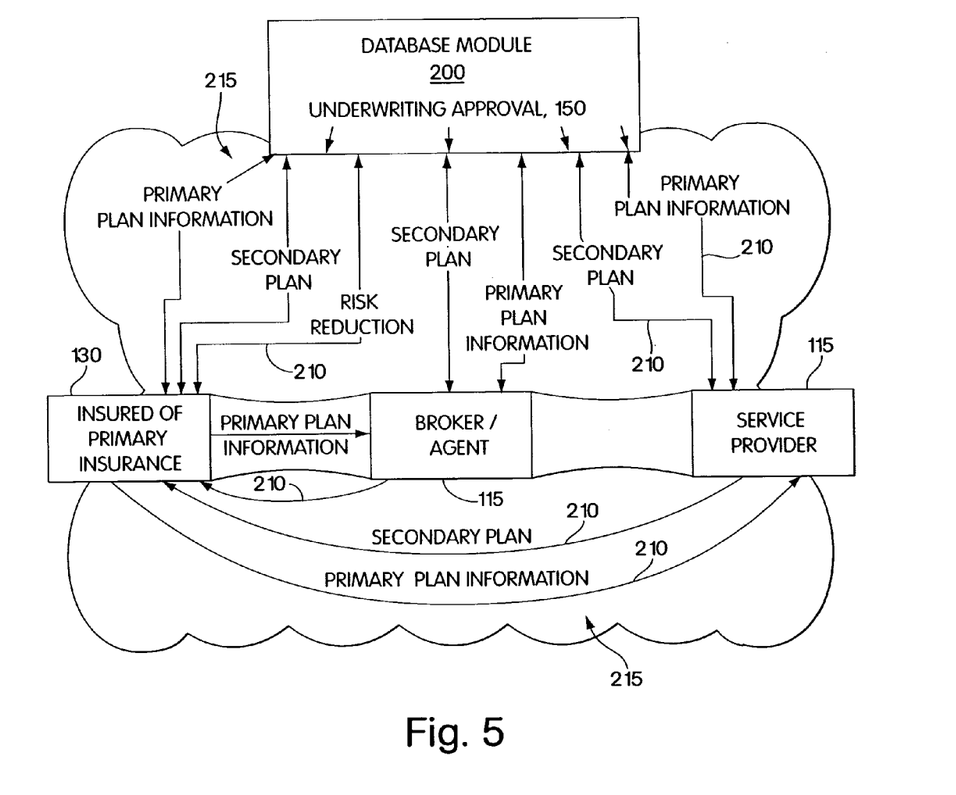
FIG. 5 is a flow diagram of a third embodiment of the invention.

Referring to FIG. 5, a third embodiment of the invention provides additional life insurance to a fully-qualified insured party through a multi-user global communication and information network, a.k.a. the internet, a network of a multiple of insurance brokers, agents and service providers 115; at least one database module 200 for compiling and storing information regarding underwriting approval 150 as well as other information provided upon issuance of a primary life insurance 140 to the insured party 130, and a multiple of electronic channels or web sites 210 providing internet access to and communication between the database module 200, the multiple of insurance brokers, agents and service providers 115, and prospective insured parties 130.

Insurance brokers, agents and service providers 115 would qualify as members or affiliates of the on-line additional insurance network 110 by agreeing to share information regarding underwriting approval 150 acquired during procurement of primary life insurance 140 to insured parties 130. Underwriting approval information 150 may include such primary life insurance information primary underwriter, plan type, benefit amount available, premium amount, etc., as well as any risk assessment and insurability information provided to member brokers, agents and service providers 115 by insured parties 130 to acquire primary life insurance 140. Consent of insured parties 130 would be required to allow underwriting approval information 150 to be disclosed by member brokers, agents and service providers 115. Underwriting approval information 150 is compiled and stored in the electronically-accessible database module 200, which may be owned and/or managed by members 115 of the additional life insurance network 110.

Insured parties 130 to whom primary life insurance 140 has been issued may contact member brokers, agents and service providers 115 directly or indirectly by accessing the database module 200 through communication facilitated by the Internet to inquire about and to qualify for secondary life insurance 145. As shown in FIG. 5, an insured party 130 contacts a member 115 through, for example, the member's web site 210 or the additional insurance network 110 web site 210 to access the database module 200. Information the insured party 130 is required to provide would include identifying data, which would be matched with the underwriting approval information 150 stored in the database module 200 to initially identify and confirm the identity of the insured party 130 and to authorize access to the underwriting approval information 150. Upon confirmation of the identity of the insured party 130, authorization is given to the additional insurance network 110 to access the primary life insurance plan 140 information stored with underwriting approval information 150 to obtain information to formulate an offer to the insured party 130 for a secondary life insurance plan 145 based upon the primary life insurance plan 140 presently held by the insured party 130.

For example, the web site 210 of the additional insurance network 110 may require the insured party 130 to provide as little information as the policy number of their primary life insurance plan 140 to access the database module 200. The policy number provided by the insured party 130 would be compared to the policy number of the primary life insurance plan 140 stored with the underwriting approval information 150 in the database module 200. Matching the policy number provided by the insured party 130 with the policy number stored in the database module 200 confirms the identity of the insured party 130 and authorizes the additional insurance network 110 to access the primary life insurance plan 140 information stored in the database module 200 to formulate an offer for a secondary life insurance plan 145 to the insured party 130. Since the insured party 130 has been previously qualified and fully-underwritten by the primary insurer 120a issuing the primary life insurance plan 140, the additional insurance network 110 may use the underwriting approval information 150 provided to members 115 and stored in the database module 200 to tailor the offer for the secondary life insurance plan 145 in accordance with the eligibility of the insured party 130 and the needs of the insured party 130 as identified by the insured party 130 during web site communication. More than one offer for secondary life insurance 145 may be made directly to the insured party 130 through web site communication, offering a variety of benefit amounts, terms, premiums, etc., depending upon the insured party's eligibility.

In addition, an anti-risk procedure 155 may be employed by the additional insurance network 110, as described above, and conducted through web site communication with the insured party 130. For example, the insured party 130 may be required to accept an on-line offer for the secondary life insurance plan 145 within a relatively short time after the primary life insurance plan 140 is issued in order for the additional insurance network 110 to avoid potential changes in risk. The insured party 130 may have the option during web site communication to either accept, deny, or place on hold for a specified period of time, the offer for the secondary life insurance plan 14, depending upon a mode by which the insured party 130 either continues or completes their web site inquiry with the member 115 or the database module 200. The secondary life insurance 145 plan can be placed in effect easily and quickly through web site communication between the insured party 130 and the additional insurance network 110 facilitated by the internet upon the confirmation of the primary life insurance 140 information and the formulation and acceptance of the offer by the insured party 130.

A fourth embodiment of the invention includes a method for providing additional life insurance to a fully-qualified insured party to increase a total benefit of life insurance to the insured party, the method comprising identifying a primary insurer; evaluating the underwriting and medical evaluation standards, guidelines and methods employed by the primary insurer to assess the eligibility of the insured party for a primary life insurance plan; accepting the primary insurer based upon approval of the underwriting and medical evaluation standards, guidelines and methods employed by the primary insurer; obtaining underwriting information from the insured party required by the primary insurer to evaluate the eligibility of the insured party for the primary life insurance place, and to approve and issue the primary life insurance plan to the insured party; providing the underwriting information to the primary insurer; receiving an underwriting approval of the insured party for the primary life insurance plan from the primary insurer; issuing the primary life insurance plan to the insured party; formulating an offer to the insured party for a secondary life insurance plan, wherein the prior underwriting approval as well as a benefit amount and type of the primary life insurance plan form a basis, in part, of the offer to the insured party; prior to offering the secondary life insurance plan to the insured party, assessing any additional risk presented by the insured party above a risk for which the primary life insurance plan was issued; and requiring the insured party comply with a risk reduction procedure as a contingency of the secondary life insurance plan. One or more risk reduction procedures may be employed, such as, although not limited to, requiring the insured party to pay a premium amount within a specified period of time, requiring the insured party to respond to one or more anti-selection questions, requiring at a statement or certification from the insured party that the insured party is in good health, and limiting acceptance of the offer to a specified period of time in order to reduce potential additional risk. The method finally comprises offering the secondary life insurance plan to the insured party and issuing the secondary life insurance play to the insured party upon acceptance of the insured party to increase the total benefit of life insurance of the insured party.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A computer-implemented method of providing additional insurance for one or more persons as a secondary insurance policy provided by a secondary insurer based on an underwriting approval of said one or more persons provided by a primary insurer for a primary insurance policy, the computer-implemented method comprising:

receiving input data including information identifying said one or more persons, at least one secondary benefit amount provided by said secondary insurance policy, and one or more underwriting standards which said primary insurer uses to provide said underwriting approval of said one or more persons for said primary insurance policy;

processing and converting said input data into output data defining said secondary insurance policy, said secondary insurance policy being issued by said secondary insurer, said secondary insurer being a different insuring entity from said primary insurer, and said secondary insurance policy being a separate policy from said primary insurance policy, wherein said processing and converting said input data into said output data includes a determination by said secondary insurer of whether said one or more underwriting standards meets one or more criteria said secondary insurer applies to determine if said secondary insurer can rely upon said underwriting approval of said primary insurer for said primary insurance policy to provide said secondary insurance policy; and if said secondary insurer can rely upon said underwriting approval of said primary insurer based upon said determination, using said output data to define and to issue said secondary insurance policy, said secondary insurance policy creating an obligation of said secondary insurer to pay said at least one secondary benefit amount, wherein said payment of said at least one secondary benefit amount is not conditioned upon payment of one or more benefit amounts provided by said primary insurance policy.

2. The method of claim 1 further comprising receiving information relating to one or more terms of said primary insurance policy, and further determining eligibility of said one or more persons for said secondary insurance policy based upon said one or more terms.

3. The method of claim 2 wherein said one or more terms includes a benefit amount of said primary insurance policy.

4. The method of claim 2 wherein said one or more terms includes a date of issuance of said primary insurance policy.

5. The method of claim 2 wherein said one or more terms includes an expiration date of said primary insurance policy.

6. The method of claim 2 wherein said one or more terms includes one or more conditions that would, if met, void said primary insurance policy.

7. The method of claim 2 wherein said one or more terms includes one or more statements received from at least one of said one or more persons in connection with the health of said at least one of said one or more persons.

8. The method of claim 2 wherein said one or more terms includes an age of at least one of said one or more persons.

9. The method of claim 2 wherein said one or more terms includes the total number of said one or more persons.

10. The method of claim 2 wherein said one or more terms includes one or more conditions precedent to payment of said benefit amount.

11. The method of claim 1 wherein said one or more underwriting standard includes one or more statements received from at least one of said one or more persons in connection with said person's health.

12. The method of claim 1 wherein said one or more underwriting standards includes an age of at least one of said one or more persons.

13. The method of claim 1 wherein said one or more underwriting standards includes a profession of at least one of said one or more persons.

14. The method of claim 1 wherein said one or more underwriting standards includes a benefit amount of said primary insurance policy.

15. The method of claim 1 wherein said one or more underwriting standards includes a term during which said primary insurance policy is effective.

16. The method of claim 1 wherein said one or more underwriting standards includes one or more responses received from at least one of said one or more persons in response to one or more antiselection questions.

17. The method of claim 1 wherein said at least one secondary benefit amount is less than a primary benefit amount provided under said primary insurance policy.

18. The method of claim 1 further comprising receiving information from at least one of said one or more persons in response to one or more queries and further determining eligibility of said one or more persons for said secondary insurance policy based on said response information.

19. The method of claim 1 further comprising receiving outcome of one or more risk reduction procedures and further determining eligibility of said one or more persons for said secondary insurance policy based on said risk reduction procedure outcome.

20. The method of claim 19 wherein one or more risk reduction procedure includes establishing a period of time during which an offer for said secondary insurance policy is effective.

21. The method of claim 19 wherein one or more risk reduction procedures includes establishing a period of time within which a payment of a premium for said secondary insurance policy is required.

22. The method of claim 1 further comprising receiving information related to at least one beneficiary of said secondary insurance policy.

23. The method of claim 22 wherein said at least one beneficiary of said secondary insurance policy includes at least one beneficiary of said primary life insurance policy.

24. A method of providing additional insurance for one or more persons as a secondary insurance policy provided by a secondary insurer based on an underwriting approval of said one or more persons provided by a primary insurer for a primary insurance policy, the method comprising:

receiving input information identifying said one or more persons and at least one secondary benefit amount provided by said secondary insurance policy;

processing said input information into output information defining said secondary insurance policy, said secondary insurance policy being issued by said secondary insurer, said secondary insurer being a different insuring entity from said primary insurer, and said secondary insurance policy being a separate policy from said primary insurance policy, wherein said processing said input information into said output information includes a determination by said secondary insurer to determine if said secondary insurer can rely upon said underwriting approval of said primary insurer for said primary insurance policy in order to provide said secondary insurance policy, and if said secondary insurer can rely upon said underwriting approval of said primary insurer based upon said determination, using said output information to define and to issue said secondary insurance policy, said secondary insurance policy creating an obligation of said secondary insurer to pay said at least one secondary benefit amount, wherein said payment of said at least one secondary benefit amount is not conditioned upon payment of one or more benefit amounts provided by said primary insurance policy.

* * * * *